INVENTOR
MAX HERBERT PASBRIG

BY Sparrow and Sparrow
ATTORNEYS

Sept. 16, 1969  M. H. PASBRIG  3,467,158
SAFETY DEVICE FOR SCREW BOLT WITH SCREW NUT
Filed March 25, 1966  2 Sheets-Sheet 2
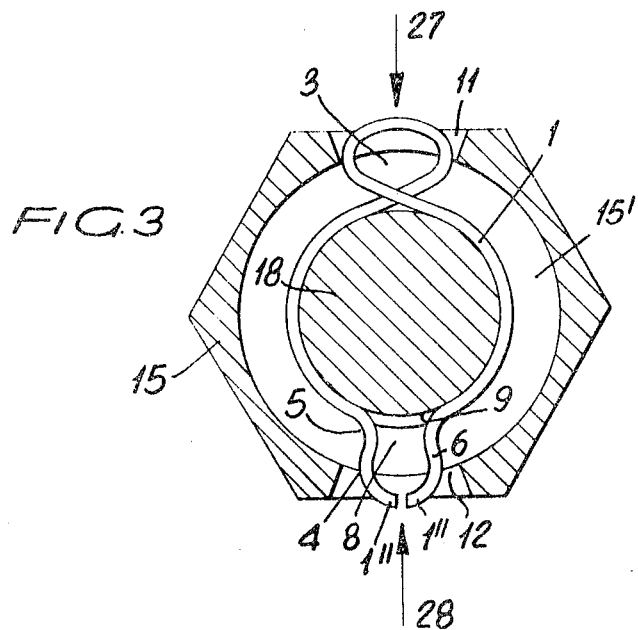
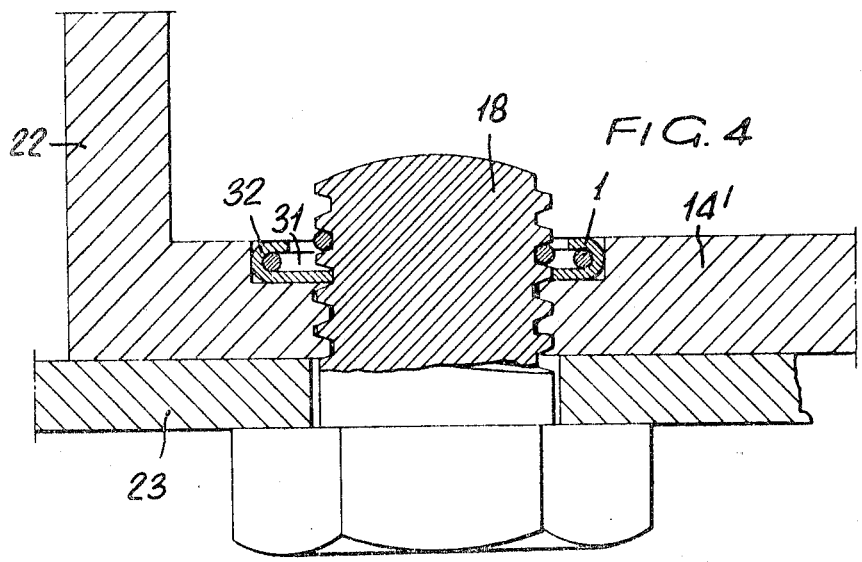
INVENTOR
MAX HERBERT PASBRIG
Max Pasbrig
BY
Sparrow and Sparrow
ATTORNEYS United States Patent Office 3,467,158
Patented Sept. 16, 1969

3,467,158
SAFETY DEVICE FOR SCREW BOLT WITH SCREW NUT
Max Herbert Pasbrig, Casa Luce, Via all'Eco 6644, Orselina, Switzerland
Filed Mar. 25, 1966, Ser. No. 537,516
Claims priority, application Switzerland, Mar. 1, 1966, 2,946/66
Int. Cl. F16b 39/00
U.S. Cl. 151—30      2 Claims

ABSTRACT OF THE DISCLOSURE

A safety device for preventing a nut from loosening itself on a screw bolt. A spring wire bent around the screw bolt, each one of its two branches engaging elastically the groove of approximately half a thread of the screw bolt. The free ends of the branches forming a radially outwardly extending grommet, and a portion of the wire diametrically opposing the free ends being twisted to form a protruding loop, whereby radial pressure on the grommet and on the loop releases the wire from the thread.

---

The invention consists in the novel parts and construction arrangements as herein shown and described. It relates to a new safety device for securing a nut on a screw bolt, which can be easily applied when the nut is tightened but which only can be released for unscrewing the nut by pressing elastically two opposing protruding parts of the device against one another, for example by placing a wrench over the nut.

The object of this invention is a safety device for screw bolt with screw nut comprising as safety element a wire-like spring which acts as a brake in one direction of the screw nut rotation only, and which acts also as an elastic connection.

The wire-like spring has in particular a section which can be fitted or adapted into the section of the cavity of the screw thread and is characterized in that it can be bent circularly in such a way as to follow approximately a coil of the screw thread and shows, in correspondence of its intermediate zone and its two free ends or zone next to said free ends, outwardly protruding parts, i.e. radially, for the support; said intermediate zone can be twisted in such a way as to form a loop.

After a preferred form of realization, the two free ends of said wire-like spring are bent toward the outer side in a semicircular form.

After another form of realization, the said free ends are bent in such a way as to tend to one point of contact forming a grommet.

The wire-like spring can be placed into a cap fixed over the screw nut; it can also be placed into an annular cavity of said screw nut, into an annular cavity of the underplaced washer or into the piece in which the screw is screwed in.

The wire-like spring can be fixed into the cap by cutting the walls of same and bending them inside; it can also be fixed into an open tubular ring of retain, placed or fixed into the inner side of said cap or into the annular cavity of the screw nut, washer or piece in which the screw is screwed in.

In the drawings:
FIG. 1 is an axial section of the screw bolt provided, as per the present invention, with a cap with a wire-like spring of safety.

FIG. 3 is the plan view from the top of the sectioned screw nut, showing a cavity which holds the wire-like spring of safety, as per the present invention, with protruding ends in order to allow the release of said screw nut.

FIG. 4 is the axial section of a further variant after which the wire-like spring is placed into an annular groove of the piece in which the screw is screwed in.

Figure 1:
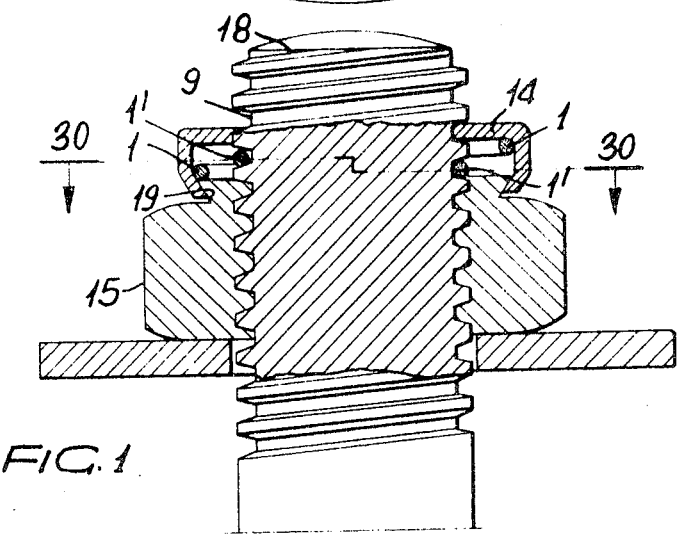

After FIG. 1 the safety device consists, as per the present invention, in a wire-like spring 1 which has such a section that can be inserted or adapted to the section of the cavity 9 of the screw thread 18.

The spring is made to bend circularly in order to follow approximately a complete coil of the thread of the screw and has hence an internal diameter which corresponds to the internal diameter of the cavity 9 of the screw.

Figure 2:
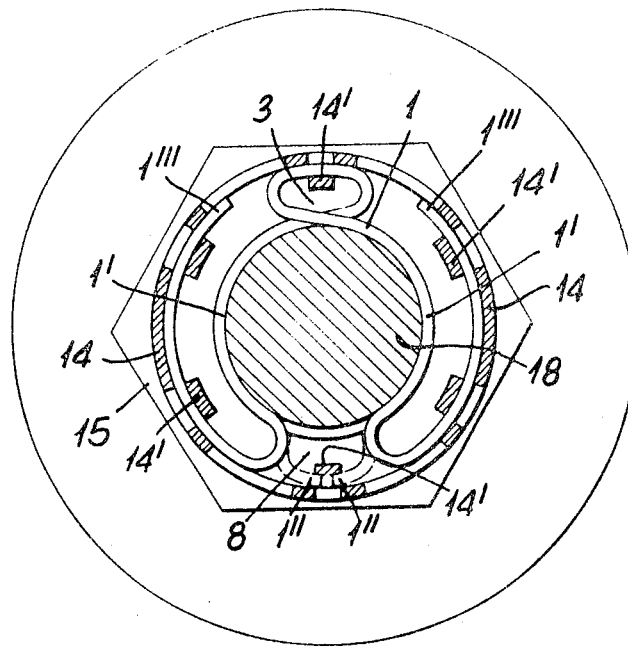
FIG. 2 is the cross section of the screw bolt of FIG. 1 drawn after the orthogonal planes to the axis passing through 30—30, section which shows the wire-like spring in two possible realization forms, one indicated with a continuous line, the other indicated with a dotted line.

The intermediate zone 3 (FIGS. 2–3) of said wire-like spring and zones 4–6 (FIG. 3) next to the free ends 1″—1″ show radial protruding parts in order to find support over the cap 14 (FIG. 1), fixed to the screw nut 15 by means of a milling 19, or in order to find support over the screw nut itself or over piece 22 (FIG. 4) in which the screw 18 is screwed in. To this purpose, very conveniently, the intermediate zone of the wire-like spring is made to be twisted in order to form a loop 3 (FIGS. 2–3), while the two free ends 1″—1″ are bent in order to tend to one point of contact forming a grommet 8. The two free ends can also be made to diverge (FIG. 2) by bending them in a U-like concentric turn externally to the stretches 1′—1′ as indicated with 1‴—1‴, i.e. after a circumference over which finds place also the extremities of loop 3.

With No. 14′ some folds internal to cap 14 are shown, which permit to retain the spring in various points. Such folds can be obtained, for example, by cutting the lateral walls of the cap and bending the cutted parts toward the top, internally, in an open tube like form.

Instead of proceeding in this way, an open tubular ring 32 (FIG. 4) can be welded, placed or fixed in any other way, in the inner side of the cap 14 into the annular cavity 31 (FIG. 4) of the piece in which the screw is to be screwed in, or into an annular cavity 15′ (FIG. 3) milled in the screw nut 15.

In order to assure the best setting of the wire-like spring 1 into the cavity 9 of the thread of the screw 18 and to avoid that the coils 1′ of the spring 1 while screwing the screw 18 are too hardly pressed, damaging in this way the thread, the bent parts 5 (FIG. 3) are made shorter than the supporting parts 4. The elastic tension on the supporting parts 4 is calibrated in such a way that during screwing said supporting parts 4 have the tendency to turn according to the direction of the axis of the screw helping the screwing itself, while turning in the opposite direction the coils 1′ are made to press against the cavity 9 of the screw thread producing in this way the stalling effect.

The releasing of the screw is therefore possible only by applying a remarkable rotation strain in the opposite direction. This is possible by using a proper key.

In the case shown in FIG. 3 the wire-like spring is located in an annular cavity 15′ of the screw bolt 15.

The screw bolt shows openings 11–12 in order to permit buttonhole 3 and grommet 8 to protrude outwardly.

Pressing radially, i.e. in the direction of the arrows 27–28, with the key, the said protruding parts of loop 3 and grommet 8, it is possible to release the pressure of coils 1' of the spring on the walls of the cavity 9 of the screw thread and to permit in this way the unscrewing of the screw nut itself.

What is claimed is:

1. A safety device in combination with a screw bolt and a screw nut comprising a one-piece wire-like spring inserted into the groove of the screw thread of said screw bolt, said spring having two branches, said branches connected by a twisted part, each of said branches including a substantially semi-circular portion engaging the groove of substantially one-half convolution of said screw thread, said semi-circular portions being in opposed relationship to define a substantially circular opening therebetween, and said twisted part of said spring protruding radially in correspondence of its intermediate zone, and the two free ends of said branches forming a radially outwardly extending grommet in diametrically disposed relationship to said twisted part, said wire-like spring being inserted in an annular cavity of said screw nut, said annular cavity having two openings, said twisted part forming a loop, said loop and grommet protruding in part outwardly through said openings, said wire-like spring arranged to be released over the screw thread by pressing said loop and said grommet in a radial direction towards one another allowing the unscrewing of said screw nut.

2. A safety device in combination with a screw bolt and a screw nut comprising a one-piece wire-like spring inserted into the groove of the screw thread of said screw bolt, said spring having two branches, said branches connected by a twisted part, each of said branches including a substantially semi-circular portion engaging the groove of substantially one-half convolution of said screw thread, said semi-circular portions being in opposed relationship to define a substantially circular opening therebetween, and said twisted part of said spring forming a loop which protrudes radially in correspondence of its intermediate zone, and the two free ends of said branches forming a radially outwardly extending grommet in diametrically disposed relationship to said twisted part.

References Cited

UNITED STATES PATENTS 1,830,918  11/1931  Sundh.
2,381,206  8/1945  Clayson _____ 151—30

FOREIGN PATENTS 1,018,269  10/1957  Germany.

RAMON S. BRITTS, Primary Examiner